(12) United States Patent  
Kupryjanow et al.

(10) Patent No.: US 12,424,232 B2  
(45) Date of Patent: Sep. 23, 2025

(54) REDUCED LATENCY STREAMING DYNAMIC NOISE SUPPRESSION USING CONVOLUTIONAL NEURAL NETWORKS

(71) Applicant: Intel Corporation, Santa Clara, CA (US)

(72) Inventors: Adam Kupryjanow, Gdansk PM (PL); Lukasz Pindor, Gdansk Pomorskie (PL)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 17/535,759

(22) Filed: Nov. 26, 2021

(65) Prior Publication Data

US 2022/0084535 A1 Mar. 17, 2022

Related U.S. Application Data

(60) Provisional application No. 63/252,687, filed on Oct. 6, 2021.

(51) Int. Cl.
  *G10L 21/0208* (2013.01)
  *G06N 3/08* (2023.01)
  (Continued)

(52) U.S. Cl.
  CPC ............ *G10L 21/0208* (2013.01); *G06N 3/08* (2013.01); *G10L 21/0232* (2013.01);
  (Continued)

(58) Field of Classification Search
  CPC ............ G10L 21/0208; G10L 21/0232; G10L 21/038; G10L 21/034; G10L 25/78;
  (Continued)

(56) References Cited

U.S. PATENT DOCUMENTS 4,914,701 A * 4/1990 Zibman ................. G10L 21/038  
                                              704/203  
11,138,292 B1 * 10/2021 Nair ....................... G06N 3/063  
(Continued)

FOREIGN PATENT DOCUMENTS

CN         113077807 A * 7/2021 ......... G10L 21/0216

OTHER PUBLICATIONS

Yi Luo and Nima Mesgarani, "Conv-TasNet: Surpassing Ideal Time-Frequency Magnitude Masking for Speech Separation", Aug. 2019, IEEE, vol. 27, No. 8, pp. 1256-1266 (Year: 2019).*

(Continued)

*Primary Examiner* — Paras D Shah  
*Assistant Examiner* — Nadira Sultana  
(74) *Attorney, Agent, or Firm* — Akona IP PC

(57) ABSTRACT

Techniques are provided for dynamic noise suppression. A methodology implementing the techniques according to an embodiment includes generating a magnitude spectrum and a phase spectrum of an input audio signal comprising speech and dynamic noise. The method also includes employing a temporal convolution network (TCN) to generate a separation mask based on the magnitude spectrum. The TCN comprises depth-wise (DW) convolution layers, each DW convolution layer including a state buffer to store a number of previous states of the associated DW convolution layer. The number of stored previous states is based on a dilation factor of the associated DW convolution layer. The method further includes multiplying the separation mask with the magnitude spectrum to separate the speech from the dynamic noise to obtain a denoised magnitude spectrum. The method further includes reconstructing the input audio signal with reduced dynamic noise based on the denoised magnitude spectrum and the phase spectrum.

20 Claims, 11 Drawing Sheets

(51) Int. Cl.
    *G10L 21/0232*    (2013.01)
    *G10L 25/30*      (2013.01)
    *G10L 25/78*      (2013.01)
    *H04R 3/04*       (2006.01)

(52) U.S. Cl.
    CPC .............. *G10L 25/30* (2013.01); *G10L 25/78* (2013.01); *H04R 3/04* (2013.01)

(58) Field of Classification Search
    CPC ........... G10L 25/30; G10L 15/16; G06N 3/08; G06N 3/063; H04R 3/04
    See application file for complete search history.

(56) References Cited

U.S. PATENT DOCUMENTS

| | | | | |
|---|---|---|---|---|
| 11,373,672 | B2* | 6/2022 | Mesgarani | G10L 25/30 |
| 11,462,231 | B1* | 10/2022 | Shankar | G10L 21/034 |
| 11,854,564 | B1* | 12/2023 | Chatlani | G10L 15/16 |
| 12,008,457 | B1* | 6/2024 | Isik | G06N 3/082 |
| 12,217,156 | B2* | 2/2025 | Khandelwal | G06N 3/045 |
| 2017/0092268 | A1* | 3/2017 | Kristjansson | G10L 15/16 |
| 2022/0215832 | A1* | 7/2022 | Ren | G10L 15/16 |

OTHER PUBLICATIONS

Samuel Sonning, Christian Sch"uldt, Hakan Erdogan, Scott Wisdom, "Performance Study of a Convolutional Time Domain Audio Separation Network for Real Time Speech Denoising", 2020, IEEE, pp. 831-835 (Year: 2020).*

Joanna Rownicka, Peter Bell, Steve Renals, "Analyzing Deep Cnn-Based Utterance Embeddings for Acoustic Model Adaptation", 2018, IEEE, pp. 235-241 (Year: 2018).*

Andong Li, Wenzhe Liu, Xiaoxue Luo, Chengshi Zheng, Xiaodong Li. "ICASSP 2021 Deep Noise Suppression Challenge: Decoupling Magnitude and Phase Optimization With a Two-Stage Deep Network" Jun. 2021, IEEE, pp. 6628-6632 (Year: 2021).*

Wei Ding, Zeyu Huang, Zunkai Huang, Li Tian, Hui Wang, Songlin Feng, "Designing efficient accelerator of depthwise separable convolutional neural network on FPGA", Dec. 2018, Journal of Systems Architecture, pp. 278-286 (Year: 2018).*

Harsh Srivastava, Kishor Sarawadekar, "A Depthwise Separable Convolution Architecture for CNN Accelerator", Oct. 2020, IEEE, Aspcon. (Year: 2020).*

Luo, Yi and Mesgarani, Nima, "Conv-TasNet: Surpassing Ideal Time-Frequency Magnitude Masking for Speech Separation," IEEE/ACM Transactions on Audio, Speech, and Language Processing, vol. 27, No. 8. Aug. 8, 2019. 12 pages.

Sonning, et al., "Performance Study of a Convolutional Time-Domain Audio Separation Network for Real-Time Speech Denoising," IEEE Xplore, retrieved Oct. 1, 2021. 5 pages.

* cited by examiner

REDUCED LATENCY STREAMING DYNAMIC NOISE SUPPRESSION USING CONVOLUTIONAL NEURAL NETWORKS

CROSS-REFERENCE TO RELATED APPLICATIONS

This application claims the benefit of U.S. Provisional Application No. 63/252,687, filed on Oct. 6, 2021, the entire contents of which is herein incorporated by reference.

BACKGROUND

Latency resulting from signal processing performed on streaming audio can have a significant impact on the quality of the user experience. For example, teleconferencing systems for online meetings and collaboration, often have a maximum threshold for total latency, from all signal processing blocks in the audio stream, such as less than 500 milliseconds (msec). One of these signal processing blocks is dynamic noise suppression, which is often employed to increase the audio quality by reducing the time varying noise component of the audio signal relative to the speech component. Dynamic noise suppression, however, can consume a large portion of the total latency budget.

Figure 1:
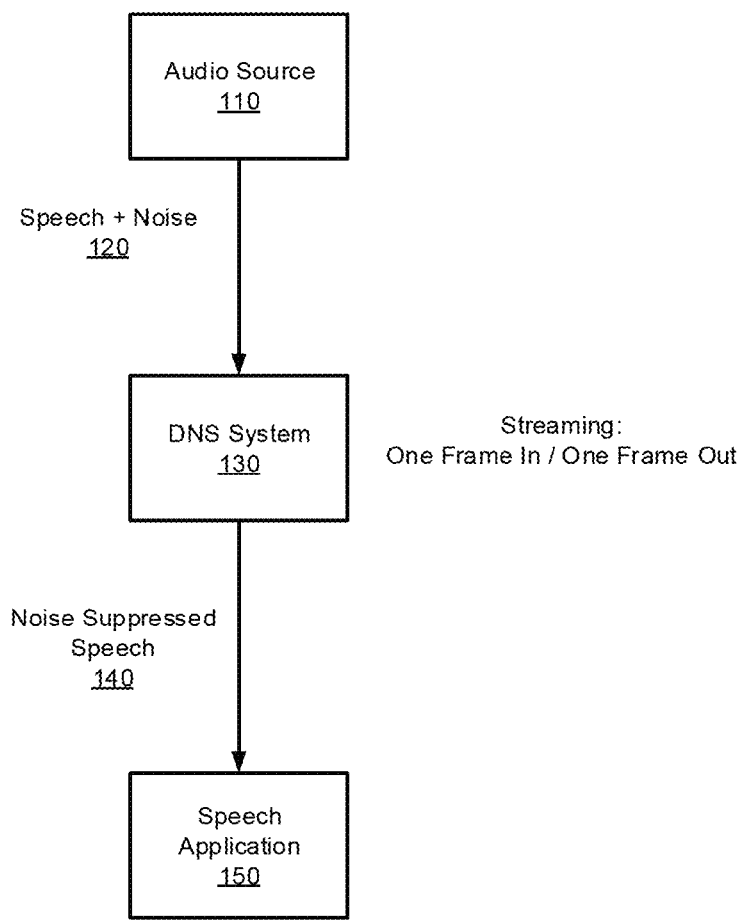
FIG. 1 illustrates an audio streaming implementation of a dynamic noise suppression (DNS) system, configured in accordance with an embodiment of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided for reduced latency streaming dynamic noise suppression (DNS) using convolutional neural networks. DNS can be employed to improve speech audio quality by reducing the time varying noise component (e.g., the dynamic noise) of the audio signal relative to the speech component. As previously noted, latency resulting from signal processing performed on streaming audio (e.g., audio processed in real-time) can have a significant impact on the quality of the user experience. This is true in many applications, and particularly so for conversational systems such as teleconferencing systems and online collaboration applications, where delays in speech are disruptive to the flow of the conversation. A maximum latency threshold (e.g., 200 msec) can be set, as a total for all signal processing block in the processing stream. DNS often consumes a large part of this latency budget. Thus, reducing latency attributable to the DNS can be helpful in meeting a given maximum latency threshold.

Techniques are provided herein for dynamic noise suppression of an audio signal, using convolutional neural networks with internal state buffering to achieve reduced latency. According to one such embodiment, the internal state buffering allows the networks to operate on smaller segments of streaming input data without sacrificing quality, since the prior state history of the network is retained in the buffer, as will be explained in greater detail. The processing of smaller segments translates directly into lower latency. Some such examples provide for post-processing of training data for the neural networks to improve the training, and ultimately the performance, of the networks, as will also be described below.

The disclosed techniques can be implemented, for example, in a computing system or a software product executable or otherwise controllable by such systems, although other embodiments will be apparent. The system or product is configured to provide dynamic noise suppression to improve the audio quality of the speech components of the audio signal. In accordance with such an embodiment, a methodology to implement these techniques includes generating a magnitude spectrum and a phase spectrum of an input audio signal comprising speech and dynamic noise. The method also includes employing a temporal convolution network (TCN) to generate a separation mask based on the magnitude spectrum. The TCN comprises depth-wise (DW) convolution layers, each DW convolution layer including a state buffer to store a number of previous states of the associated DW convolution layer. The number of stored previous states is based on a dilation factor of the associated DW convolution layer. The method further includes multiplying the separation mask with the magnitude spectrum to separate the speech from the dynamic noise to obtain a denoised magnitude spectrum. The method further includes reconstructing the input audio signal with reduced dynamic noise based on the denoised magnitude spectrum and the phase spectrum.

As will be appreciated, the techniques described herein may provide improved noise suppression with reduced latency, compared to existing techniques that require the application of computationally complex operations to large segments of audio data resulting in unacceptable latency, or that operate on smaller segments of data but provide lower quality noise reduction. The disclosed techniques can be implemented on a broad range of platforms including workstations, laptops, tablets, and smartphones, and voice controlled systems. These techniques may further be implemented in hardware or software or a combination thereof.

System Architecture

FIG. 1 illustrates, at a high level, an audio streaming implementation 100 of a dynamic noise suppression (DNS) system 130, configured in accordance with an embodiment of the present disclosure. As shown, an audio source 110 provides an audio signal 120 that comprises speech and dynamic noise. The audio source 110 may be a microphone (or array of microphones) or any other suitable source that provides streaming audio. The speech component of the audio signal will likely not be present continuously since people tend to pause for various reasons while they are speaking, and the pauses may be of varying lengths. The dynamic noise component may also vary over time. Examples of dynamic noise include a crying baby, a barking dog, a phone ringing, the sound of a doorbell, horn, or siren, etc. All of these types of noise can be distracting and annoying, for example, to listeners on a conference call.

A DNS system 130 is shown which is configured to processing the streaming audio signal 120 on a frame by frame basis and reduce or suppress the noise to provide noise suppressed speech 140 as an output. The size of a frame may vary, but in some embodiments, a frame may be 8 msec in duration. The noise suppressed speech 140 may then be used by any desired speech based audio application 150, including, for example, a communication system, a teleconferencing or online collaboration system, a speech recognition system, etc.

Figure 2:
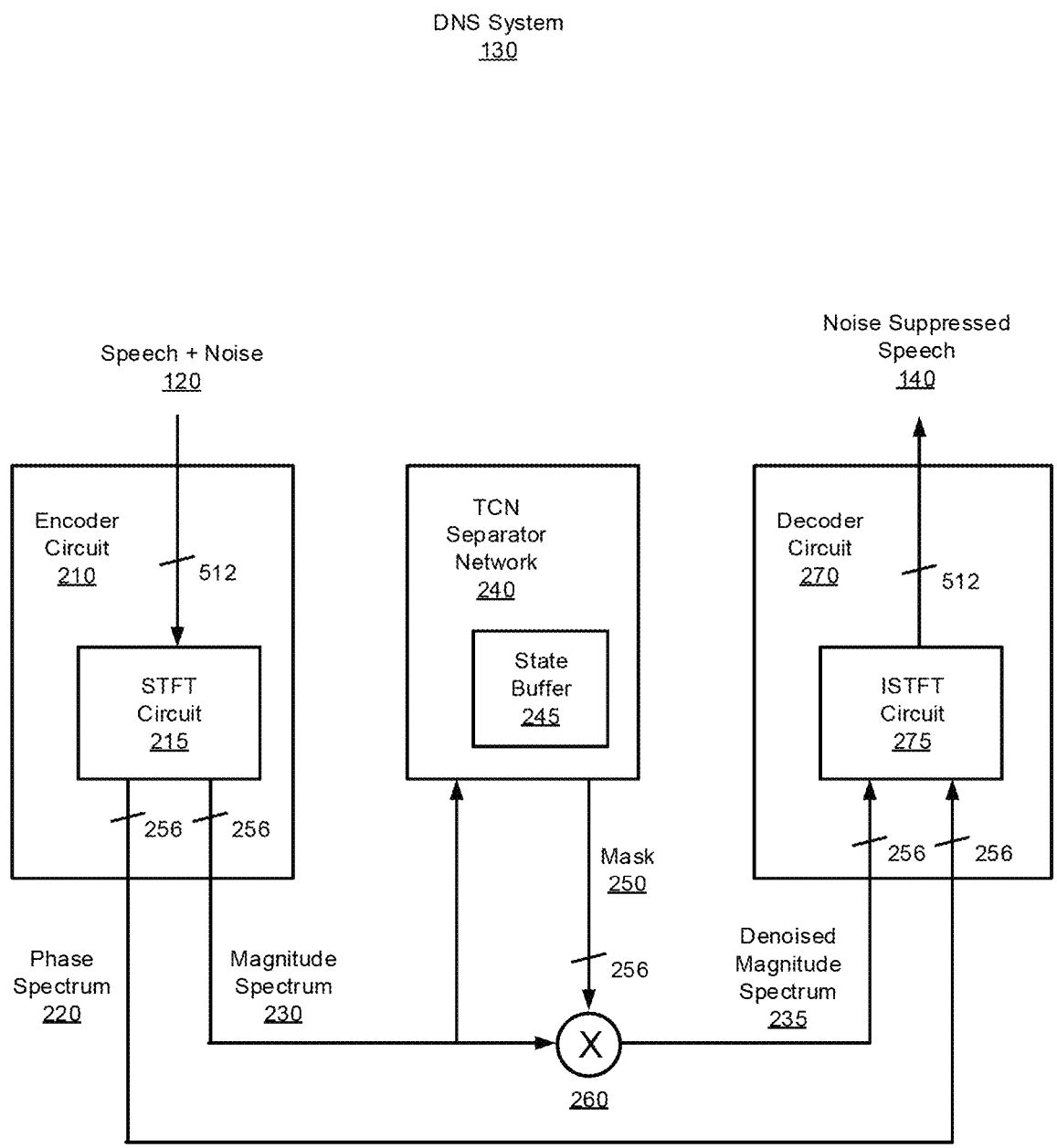
FIG. 2 is a block diagram of the DNS system of FIG. 1, configured in accordance with an embodiment of the present disclosure.

FIG. 2 is a block diagram of the DNS system 130 of FIG. 1, configured in accordance with an embodiment of the present disclosure. The DNS system 130 is shown to include an encoder circuit 210, a temporal convolution network (TCN) separator 240, a multiplier (or mixer) 260, and a decoder circuit 270. The encoder circuit 210 is shown to include a short-time Fourier transform (STFT) circuit 215. The TCN separator network 240, which will be described in greater detail below, is shown to include a state buffer 245. The decoder circuit 270 is shown to include an inverse short-time Fourier transform (ISTFT) circuit 275.

The encoder circuit 210 is configured to determine the sinusoidal frequency and phase content of an input audio signal 120 that can include speech and dynamic noise. The encoder 210 employs an STFT 215 to generate an approximation of the magnitude spectrum 230 and the phase spectrum 220 of the input audio signal 120. In the example illustrated in FIG. 2, the time domain input audio signal 120 is shown to be of length 512 samples (for one frame), and the magnitude and phase spectra are each shown to comprise 256 frequency bins (which may be referred to herein as channels), although other sizes are possible.

The operation of the TCN separator network 240 will be described in greater detail below, but at a high level, the network is configured to separate speech from dynamic noise by generating a separation mask 250 based on the magnitude spectrum 230. The separation mask is a weighting function for the magnitude spectrum which is applied to the magnitude spectrum by the multiplier 260 to generate a denoised magnitude spectrum 235. In some embodiments, the mask 250 is a discrete or digital signal having continuous values in the range between zero and one, with zero indicating all noise and one indicating all speech. In other words, the mask provides an indication of areas where there is speech and areas where there is noise.

The decoder circuit 270 is configured to receive the denoised magnitude spectrum 235 from the multiplier 260 along with the original phase spectrum 220 from the encoder 210. The decoder 270 reconstructs the audio signal without dynamic noise (noise suppressed speech 140) by calculating the inverse short-time Fourier transform (ISTFT) of the denoised magnitude spectrum 235 using the original phase spectrum 220.

Figure 3:
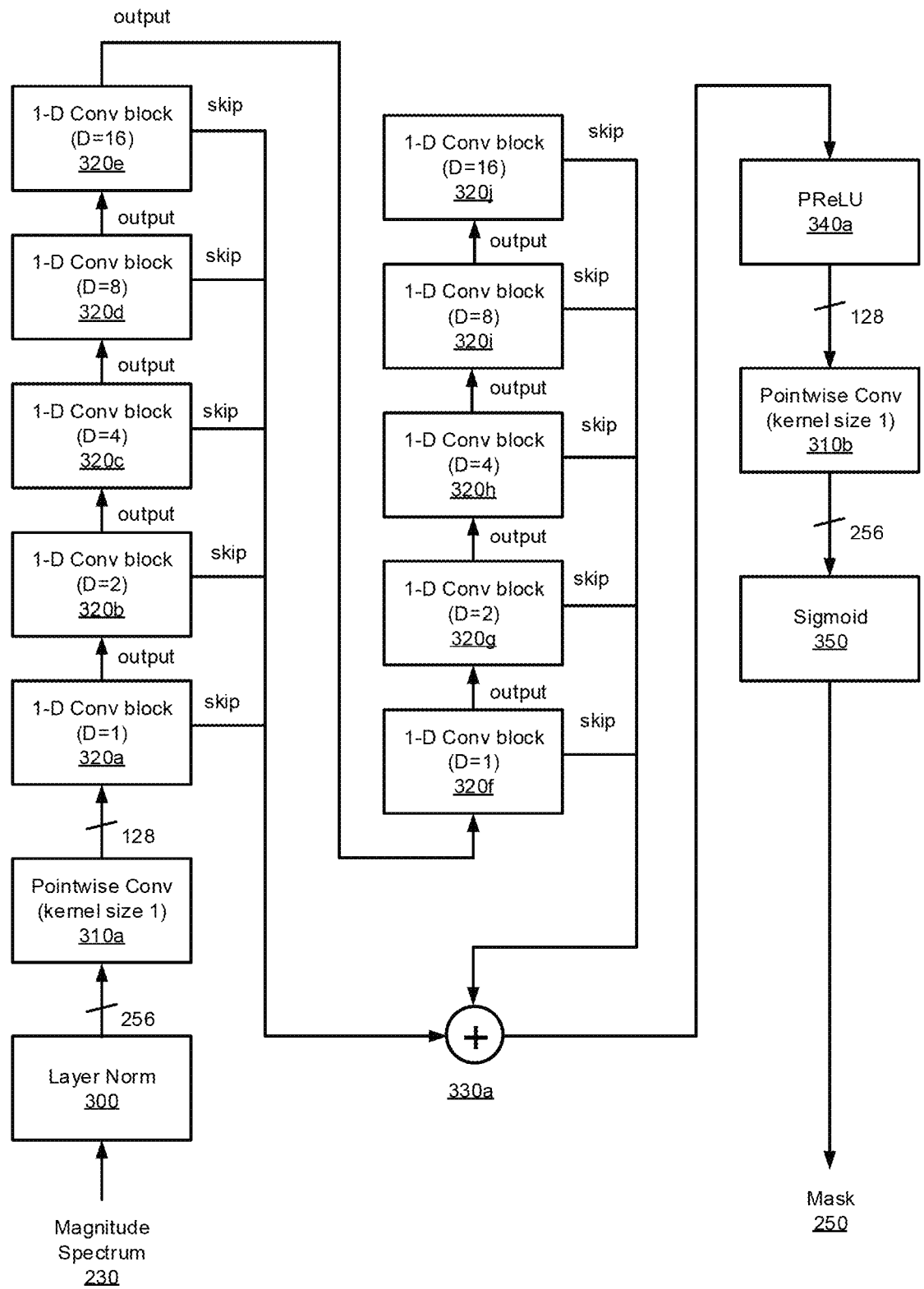
FIG. 3 is a block diagram of a temporal convolution network (TCN) of the DNS system of FIGS. 1 and 2, configured in accordance with an embodiment of the present disclosure.

FIG. 3 is a block diagram of the TCN separator network 240, configured in accordance with an embodiment of the present disclosure. The TCN separator network 240 is shown to include a normalization layer 300, a 1×1 pointwise convolution layer 310a, a first stack of 1-D dilated convolution blocks 320a-320f, a second stack of 1-D dilated convolution blocks 320f-320j, a summer 330a, a parametric rectified linear unit (PReLU) layer 340a, a 1×1 pointwise convolution layer 310b, and a Sigmoid layer 350.

The normalization layer 300 is configured to normalize the distribution of features of intermediate layers of the network which provides for faster training and generally increased accuracy.

The 1×1 pointwise convolution layer 310a is configured to reduce the dimension of the data as it passes to the next layer, in this example from 256 channels to 128 channels.

The first stack of 1-D dilated convolution blocks includes blocks 320a-320f and the second stack of 1-D dilated convolution blocks includes 320f-320j. In some embodiments, any number of stacks may be used, and each stack may include any number of convolutional blocks. As the complexity of the TCN increases with additional stacks and/or convolution blocks, the performance generally increases at a cost of additional computational cost and memory size. These stacks of convolution blocks are trained, using any suitable training technique, to distinguish speech from dynamic noise based on the magnitude spectrum 230, and generate the separation mask 250 that can be used to separate the speech from noise in the frequency domain. In each stack the dilation factor increases exponentially for each convolution block. For example, for X number of convolutional blocks in a stack, the dilation factor for the $X^{th}$ layer is $2^{X-1}$. So, in this example, the dilation factors for a stack of five blocks are 1, 2, 4, 8, and 16, respectively.

The parametric rectified linear unit (PReLU) layer 340a is configured to apply an activation function to the output of the second stack of convolution blocks.

The 1×1 pointwise convolution layer 310b is configured to increase the dimension of the data as it passes to the next layer, in this example from 128 channels to 256 channels, to fit the desired size of the separation mask 250.

The Sigmoid layer 350 is configured to generate the separation mask as a continuous function with values between zero and one, with values of zero representing all noise and values of one representing all speech.

Figure 4:
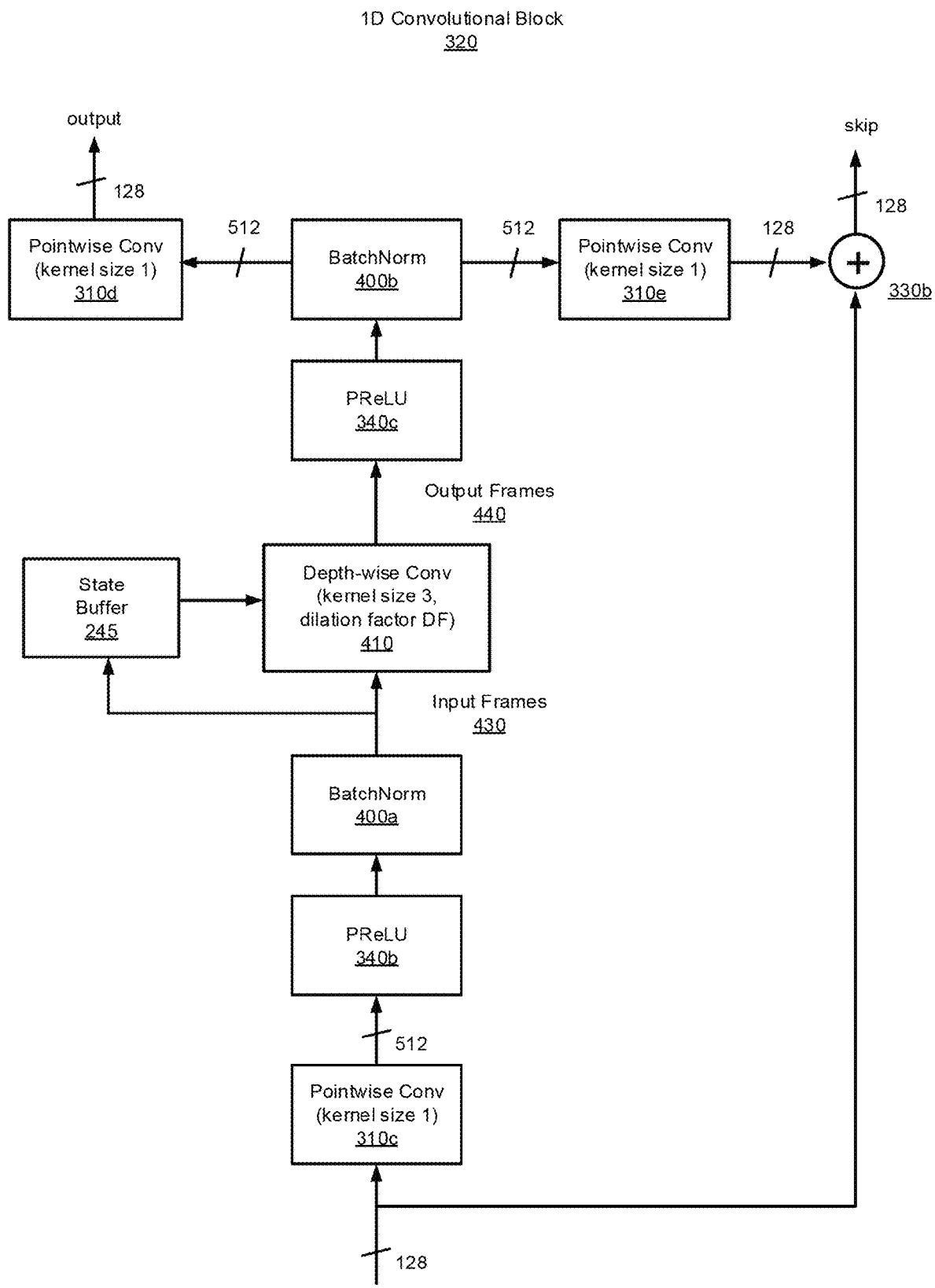
FIG. 4 is a block diagram of the 1-dimensional convolutional blocks of the TCN of FIG. 3, configured in accordance with an embodiment of the present disclosure.

FIG. 4 is a block diagram of the 1-dimensional convolutional blocks 320 of the TCN network 240, configured in accordance with an embodiment of the present disclosure. The TCN network 240 is shown to include a 1×1 pointwise convolution layer 310c, a PReLU layer 340b, a batch normalization layer 400a, a depth-wise convolution layer 410, another PReLU 340c, another batch normalization layer 400b, two additional 1×1 pointwise convolution layers 310d (for the output) and 310e for the skip connection, and a summer 330b.

The 1×1 pointwise convolution layer 310c is configured to increase the dimension of the data for subsequent processing, in this example from 128 channels to 512 channels. The PReLU layer 340b is configured to apply another activation function. The batch normalization layer 400a is configured to re-normalize the distribution of features in the data.

The depth-wise convolution layer 410 is the portion of the TCN network that is trained/configured to perform the DNS function. In this example, the kernel size is three, but in some embodiments, the kernel size may be any suitable value. Latency reduction is achieved through the use of a state buffer 245 that is associated with each depth-wise convolution layer 410, as will be described in greater detail below, in connection with FIGS. 5A, 5B, and 5c.

The second PReLU 340c is configured to apply another activation function. The second batch normalization layer 400b is configured to re-normalize the distribution of features in the data. The additional 1×1 pointwise convolution layer 310d is configured to decrease the dimension of the data that is output from the block, in this example from 512 channels to 128 channels. The other additional 1×1 pointwise convolution layer 310e is configured to decrease the dimension of the data that is output from the block for use as a skip connection, in this example from 512 channels to 128 channels. The summer 330b is configured to generate the skip connection output for the block as a sum of the block input and the block output (from pointwise convolution layer 310e).

Figure 5A:
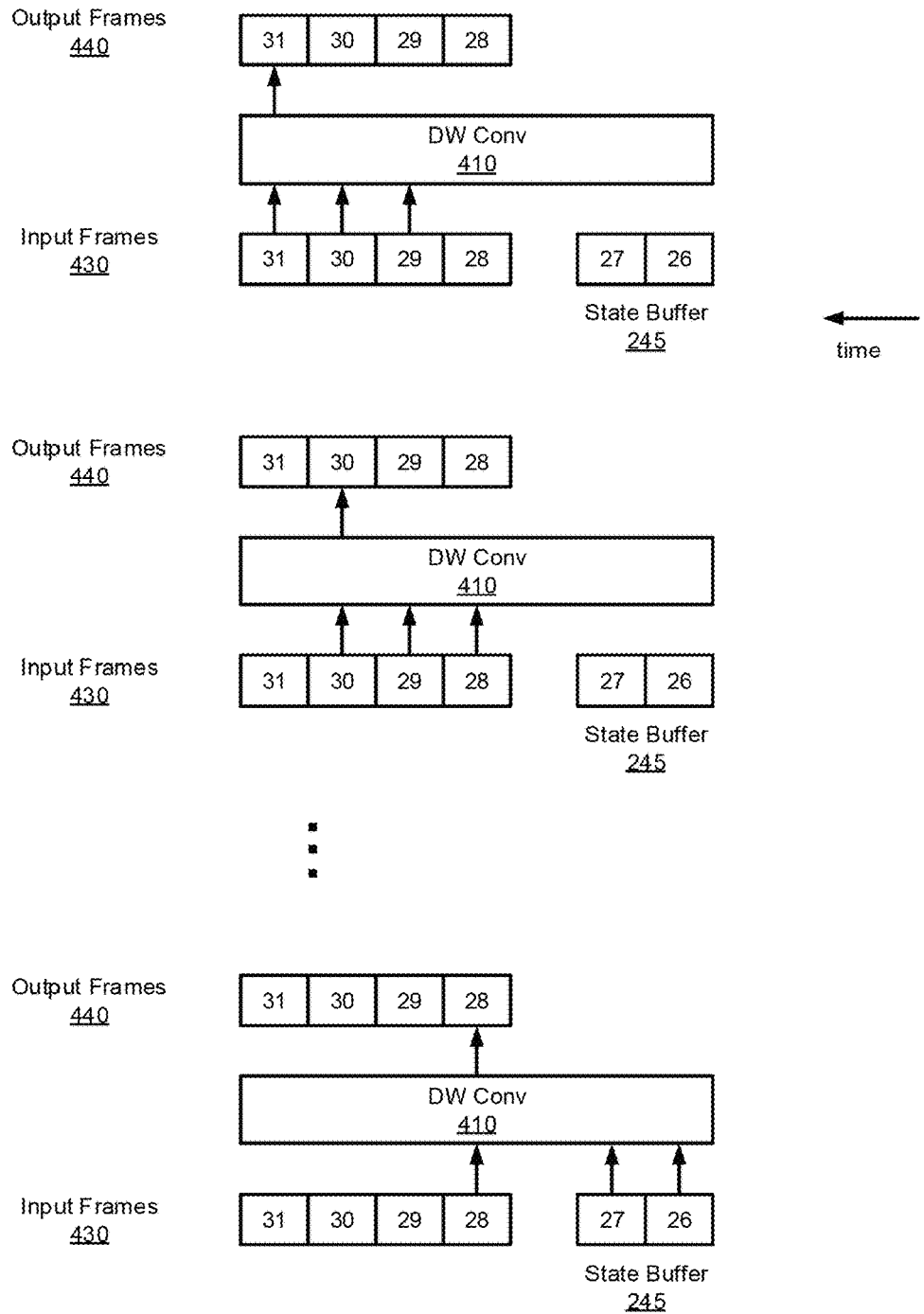
FIG. 5A illustrates depth-wise convolution buffering with a dilation factor of one, in accordance with an embodiment of the present disclosure.

FIG. 5A illustrates depth-wise convolution buffering 500a with a dilation factor of one, in accordance with an embodiment of the present disclosure. The depth-wise convolution layer 410 is shown to receive input frames 430 in sequence over time, with frame number 31 being the most recent or current frame, frame number 30 being the previous frame, and so on, back to frame number 26 being the fifth previous frame. In this example, the depth-wise convolution is performed in batches of 4 frames (e.g., frames 28 through 31), although in other embodiments, different batch lengths may be used. Thus, 4 input frames 430 are processed to produce 4 output frames 440 with a dilation factor of one. So, output frame 31 is a convolution of input frames 31 through 29, output frame 30 is a convolution of input frames 30 through 28, output frame 29 (not shown) is a convolution of input frames 29 through 27, and output frame 28 is a convolution of input frames 28 through 26. Because frames 27 and 26 are not available in the current batch of 4 frames (28-31), state buffer 245 is employed for this depth-wise convolution layer to remember those previous two input frames. Without the state buffer 245, six frames of data (26-31) would need to be processed by the entire TCN 240 in order to generate four output frames (28-31) with a dilation factor of one.

Figure 5B:
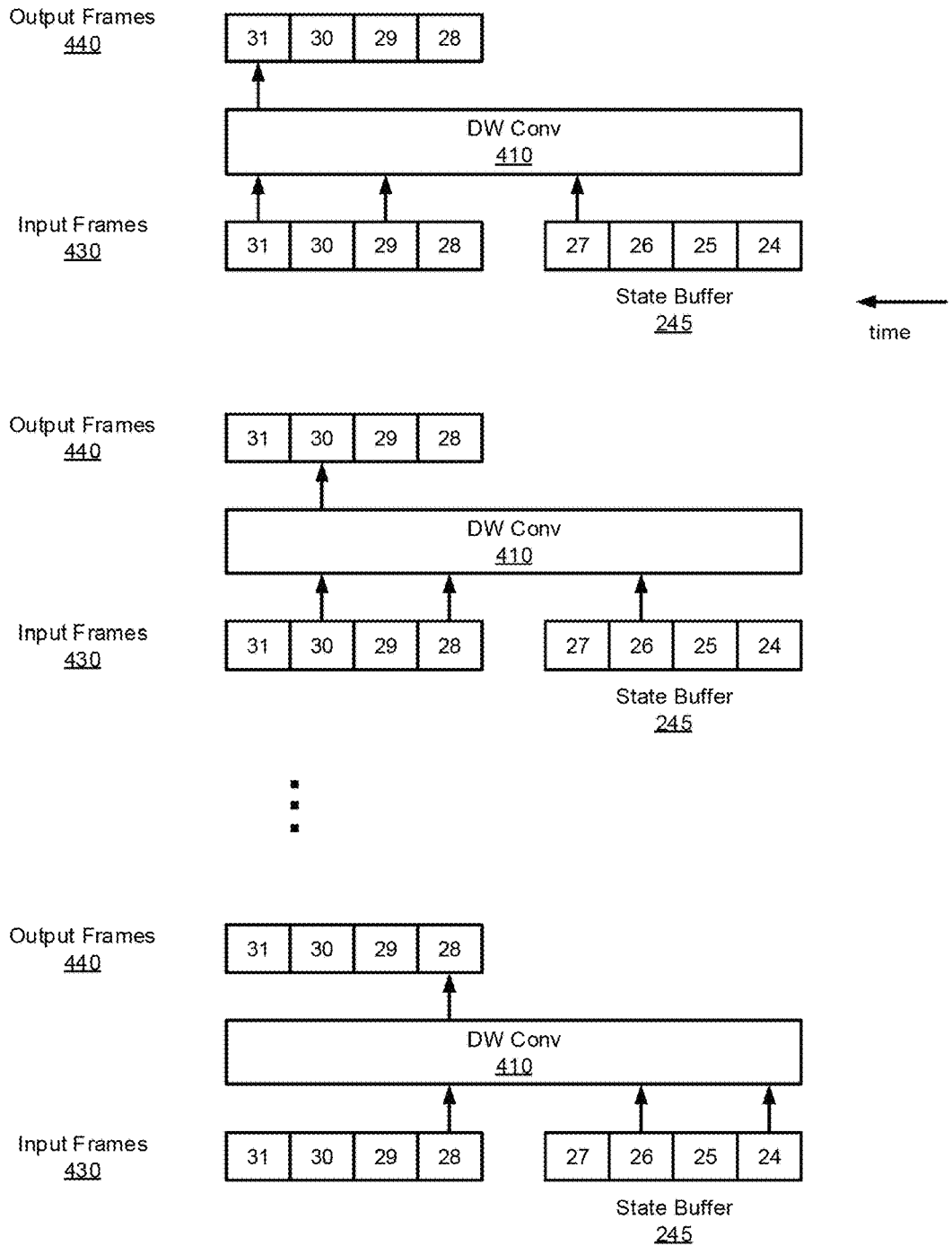
FIG. 5B illustrates depth-wise convolution buffering with a dilation factor of two, in accordance with an embodiment of the present disclosure.

FIG. 5B illustrates depth-wise convolution buffering 500b with a dilation factor of two, in accordance with an embodiment of the present disclosure. The depth-wise convolution layer 410 is shown to receive input frames 430 in sequence over time, with frame number 31 being the most recent or current frame, frame number 30 being the previous frame, and so on, back to frame number 24. In this example, the depth-wise convolution is again performed in batches of 4 frames (e.g., frames 28 through 31), although in other embodiments, different batch lengths may be used. Thus, 4 input frames 430 are processed to produce 4 output frames 440 with a dilation factor of two. So, output frame 31 is a convolution of input frames 31, 29 and 27, output frame 30 is a convolution of input frames 30, 28 and 26, output frame 29 (not shown) is a convolution of input frames 29, 27, and 25, and output frame 28 is a convolution of input frames 28, 26, and 24. Because frames 27 through 24 are not available in the current batch of 4 frames (28-31), state buffer 245 is employed for this depth-wise convolution layer to remember those previous four input frames. Without the state buffer 245, eight frames of data (24-31) would need to be processed by the entire TCN 240 in order to generate four output frames (28-31) with a dilation factor of two.

Figure 5C:
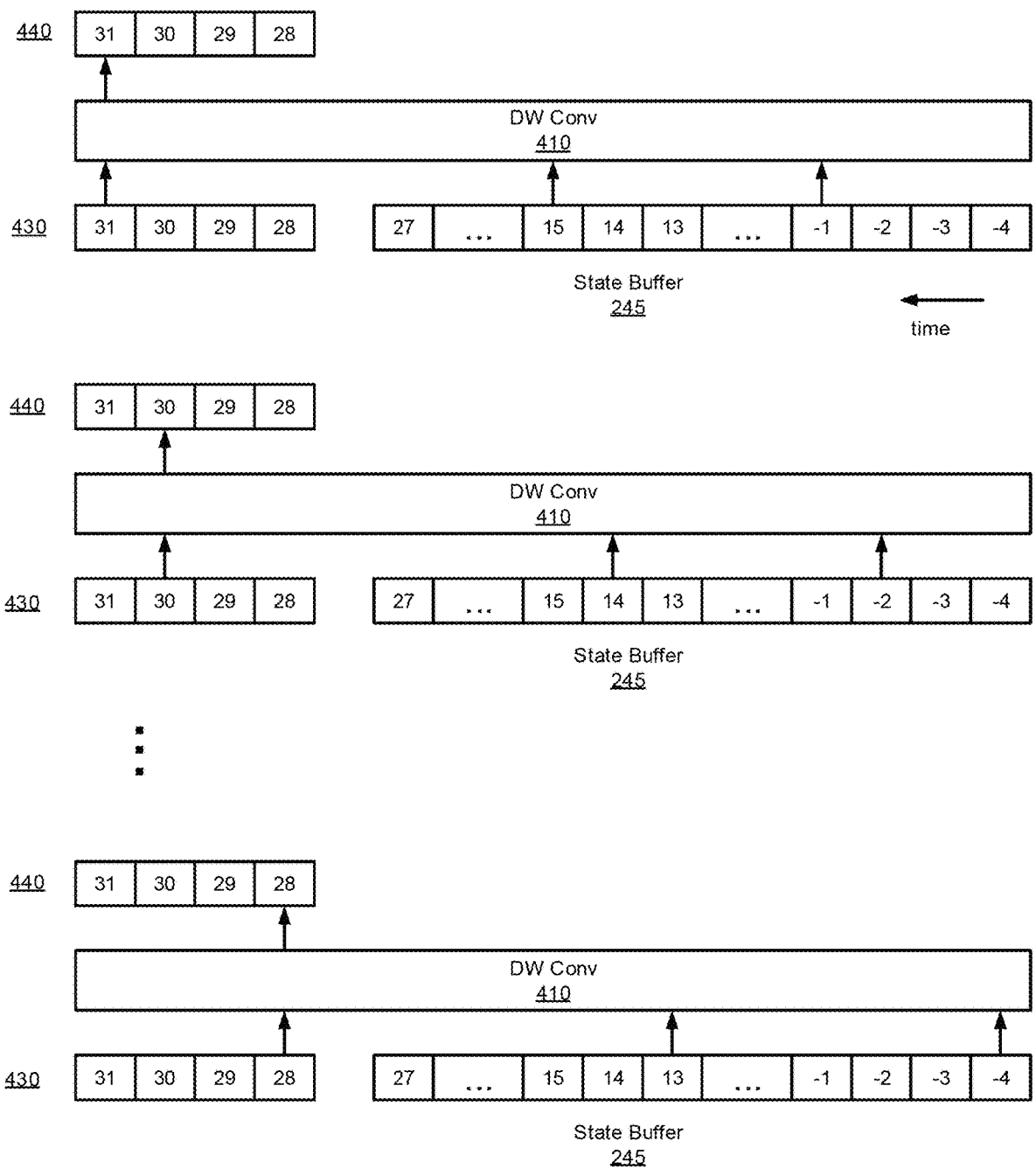
FIG. 5C illustrates depth-wise convolution buffering with a dilation factor of 16, in accordance with an embodiment of the present disclosure.

Skipping forward to the case of dilation factor 16, FIG. 5C illustrates depth-wise convolution buffering 500c with a dilation factor of 16, in accordance with an embodiment of the present disclosure. The depth-wise convolution layer 410 is shown to receive input frames 430 in sequence over time, with frame number 31 being the most recent or current frame, frame number 30 being the previous frame, and so on, back to frame number −4. In this example, the depth-wise convolution is again performed in batches of 4 frames (e.g., frames 28 through 31), although in other embodiments, different batch lengths may be used. Thus, 4 input frames 430 are processed to produce 4 output frames 440 with a dilation factor of 16. So, output frame 31 is a convolution of input frames 31, 15 and −1, output frame 30 is a convolution of input frames 30, 14 and −2, output frame 29 (not shown) is a convolution of input frames 29, 13, and −3, and output frame 28 is a convolution of input frames 28, 13, and −4. Because frames 27 through −4 are not available in the current batch of 4 frames (28-31), state buffer 245 is employed for this depth-wise convolution layer to remember those previous 32 input frames. Without the state buffer 245, 36 frames of data (−4 through 31) would need to be processed by the entire TCN 240 in order to generate four output frames (28-31) with a dilation factor of 16.

As can be seen from the examples described in FIGS. 5A, 5B, and 5C, use of the state buffer 245 to store previous input frames to the convolutional blocks 320 results in an improvement in computational efficiency since the previously computed inputs do not need to be recomputed for each new frame. This also results in a decrease in latency since the system does not need to wait for 36 previous frames to be processed before outputting a new frame. In some embodiments, the state buffers may be implemented as circular buffers and they may be initialized with zeros to avoid startup latency. In some embodiments, the overall latency of the DNS system may be reduced from 120 msec to 48 msec and the computation time may be reduced by a factor of eight. Additionally, the output of the disclosed DNS system, according to an embodiment, can provide "bit exact" duplication of the output of an offline DNS implementation that operates on a recording of an entire audio session (e.g., a non-real-time system with unbounded latency).

Figure 6:
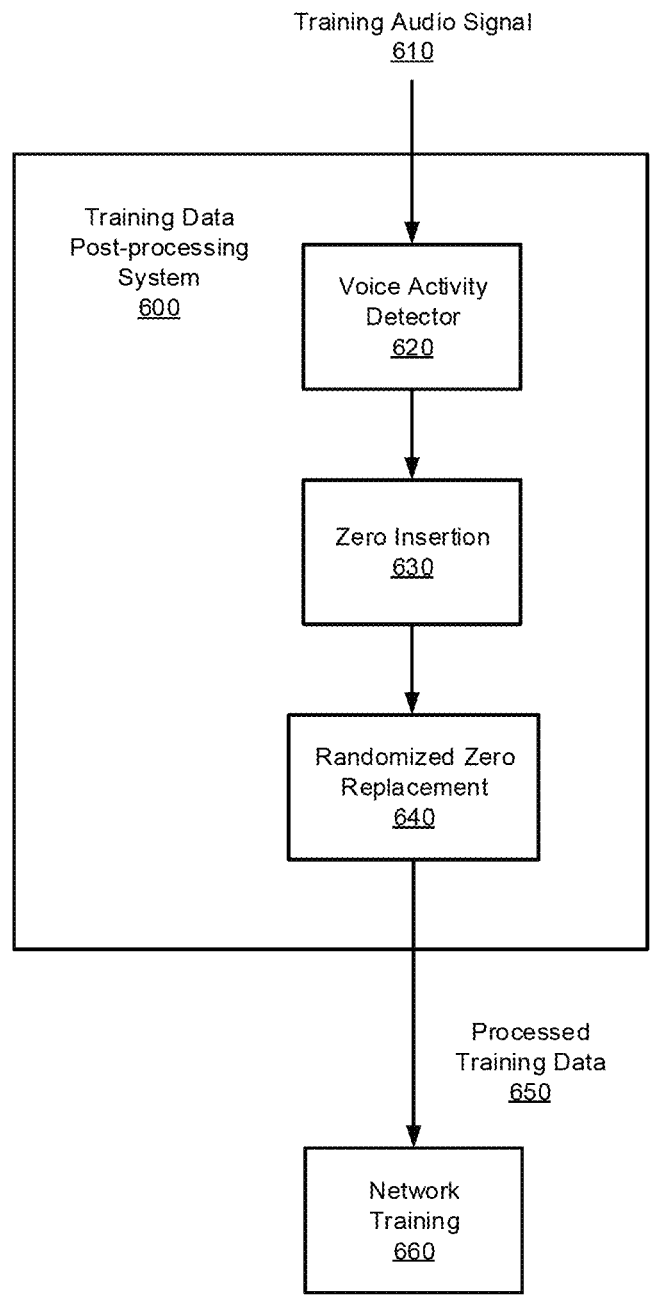
FIG. 6 is a block diagram of a training data post-processing system, configured in accordance with an embodiment of the present disclosure.

FIG. 6 is a block diagram of a system 600 for post-processing of training data, configured in accordance with an embodiment of the present disclosure. The training data post-processing system 600 is shown to include a voice activity detector (VAD) 620, a zero insertion circuit 630, and a randomized zero replacement circuit 640.

The VAD 620 is configured to receive training audio signals 610 that includes periods of speech, periods of non-speech, and dynamic noise. The VAD 620 is further configured to detect the presence of speech (e.g., voice) in those signals and identify the time periods associated with that speech.

The zero insertion circuit 630 is configured to zero out selected samples of the training audio signal 610 that are associated with segments of the training audio 610 that do not include the speech component.

The randomized zero replacement circuit 640 is configured to further zero out selected samples of the training audio signal 610 that are chosen by a randomized process. For example, in some embodiments, ten percent of the samples may be replaced by zeros (whether or not they are associated with speech), and those samples may be selected on a random or pseudo random basis.

The resulting processed training data 650 is used for network training 660 of the TCN separator network 240 to completely remove portions of the signal which are not considered speech. This improves training effectiveness since the trained network can focus more on speech denoising (e.g., reducing noise in portions of the audio signal that include voice activity), and also enables the network to generate zero valued output when there is no voice activity.

Figure 7:
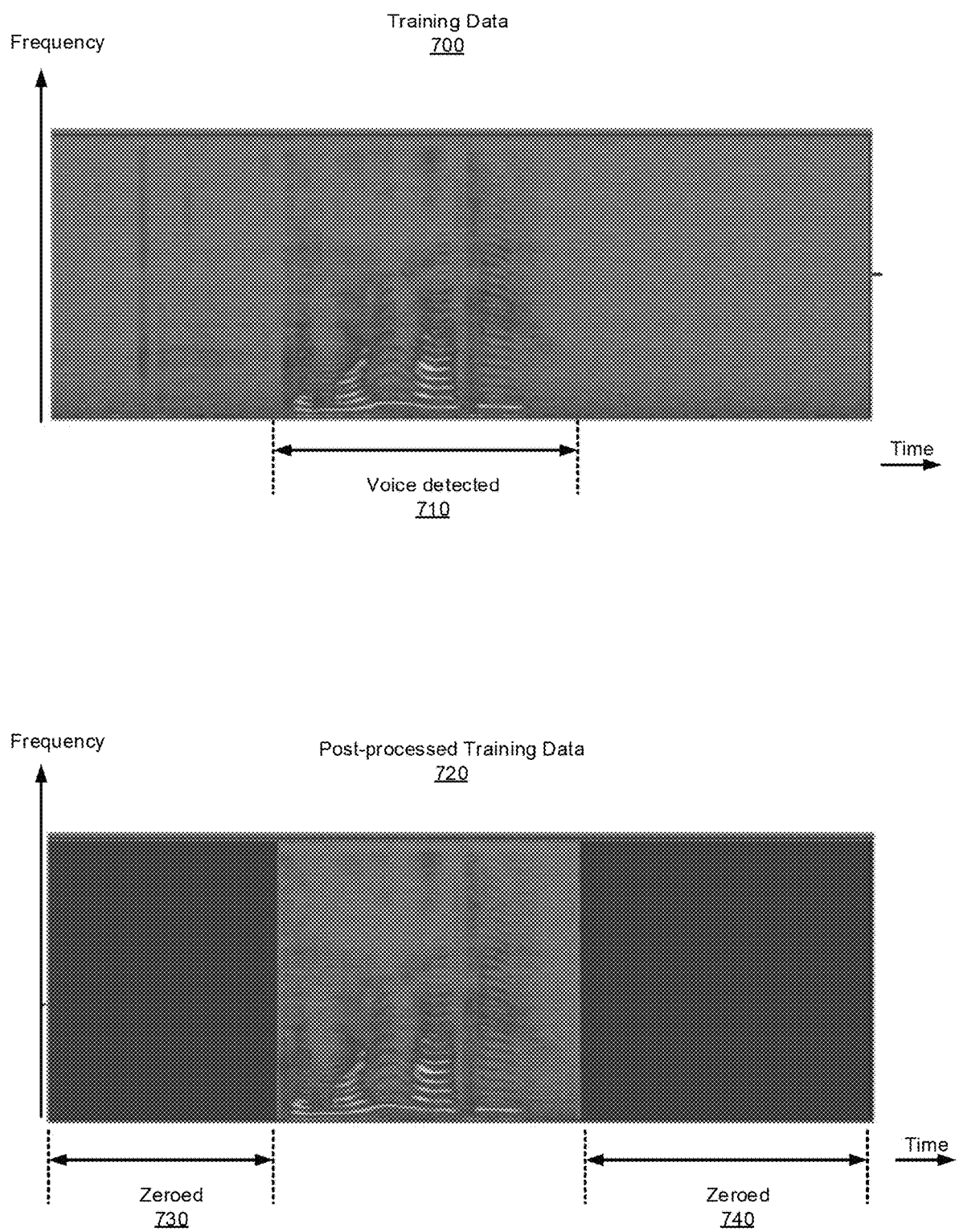
FIG. 7 illustrates training data and post-processed training data, in accordance with an embodiment of the present disclosure.

FIG. 7 illustrates a comparison of spectrograms of training data 700 and post-processed training data 720, in accordance with an embodiment of the present disclosure. The spectrograms 700 and 720 show signal energy as a function of frequency (or channels) along the vertical axis and time along the horizontal axis. The VAD 620 detects voice in the region 710 of the training data 700. Zero insertion 630 is performed based on the VAD results such that regions 730 and 740 are zeroed out, as shown in the post-processed training data 720. Randomized zero replacement 640 may also be performed through out the signal, including the speech regions, although this is not shown in these figures.

Methodology

Figure 8:
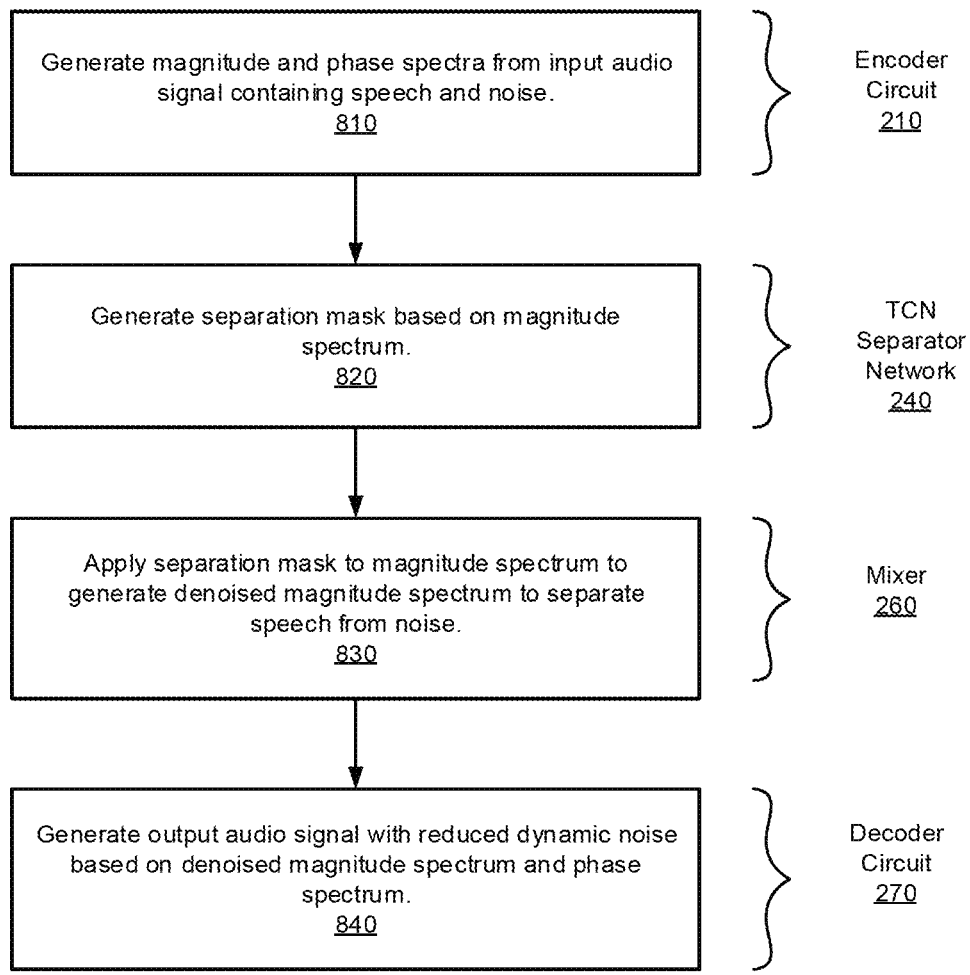
FIG. 8 is a flowchart illustrating a methodology for dynamic noise suppression, in accordance with an embodiment of the present disclosure.

FIG. 8 is a flowchart illustrating a methodology 800 for dynamic noise suppression, in accordance with an embodiment of the present disclosure. As can be seen, the example method includes a number of phases and sub-processes, the sequence of which may vary from one embodiment to another. However, when considered in the aggregate, these phases and sub-processes form a process for reduced latency dynamic noise suppression of streaming audio using convolutional neural networks, in accordance with certain of the embodiments disclosed herein. These embodiments can be implemented, for example, using the system architecture illustrated in FIGS. 1-6, as described above. However other system architectures can be used in other embodiments, as will be apparent in light of this disclosure. To this end, the correlation of the various functions shown in FIG. 8 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 800. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

As illustrated in FIG. 8, in an embodiment, method 800 for dynamic noise suppression commences by generating, at operation 810, a magnitude spectrum and a phase spectrum of an input audio signal that may include speech and dynamic noise. In some embodiments, the magnitude and phase spectra are generated by a short-time Fourier transform.

Next, at operation 820, a TCN is employed to generate a separation mask based on the magnitude spectrum. In some embodiments, the TCN comprises one or more depth-wise (DW) convolution layers, each DW convolution layer including a state buffer to store a number of previous states of that associated DW convolution layer. The number of stored previous states is based on a dilation factor of the associated DW convolution layer. In some embodiments, the dilation factors may range from one to 16 for different DW convolution layers, and the number of stored previous states is twice the dilation factor.

At operation 830, the separation mask is applied to (e.g., multiplied with) the magnitude spectrum to separate the speech from the dynamic noise to obtain a denoised magnitude spectrum.

At operation 840, the input audio signal is reconstructed with reduced dynamic noise based on the denoised magnitude spectrum and the original phase spectrum. In some embodiments, the resulting noise suppressed speech signal is generate by an inverse short-time Fourier transform of the denoised magnitude spectrum and the original phase spectrum.

Of course, in some embodiments, additional operations may be performed, as previously described in connection with the system. For example, the TCN may be trained using post-processed training data. In some embodiments, the processed training data is generated by zeroing out samples of training audio data (which includes speech and dynamic noise) at places where a VAD determines that no speech is present. In some embodiments, an additional randomized zero replacement process is applied to the processed training data.

Example System

Figure 9:
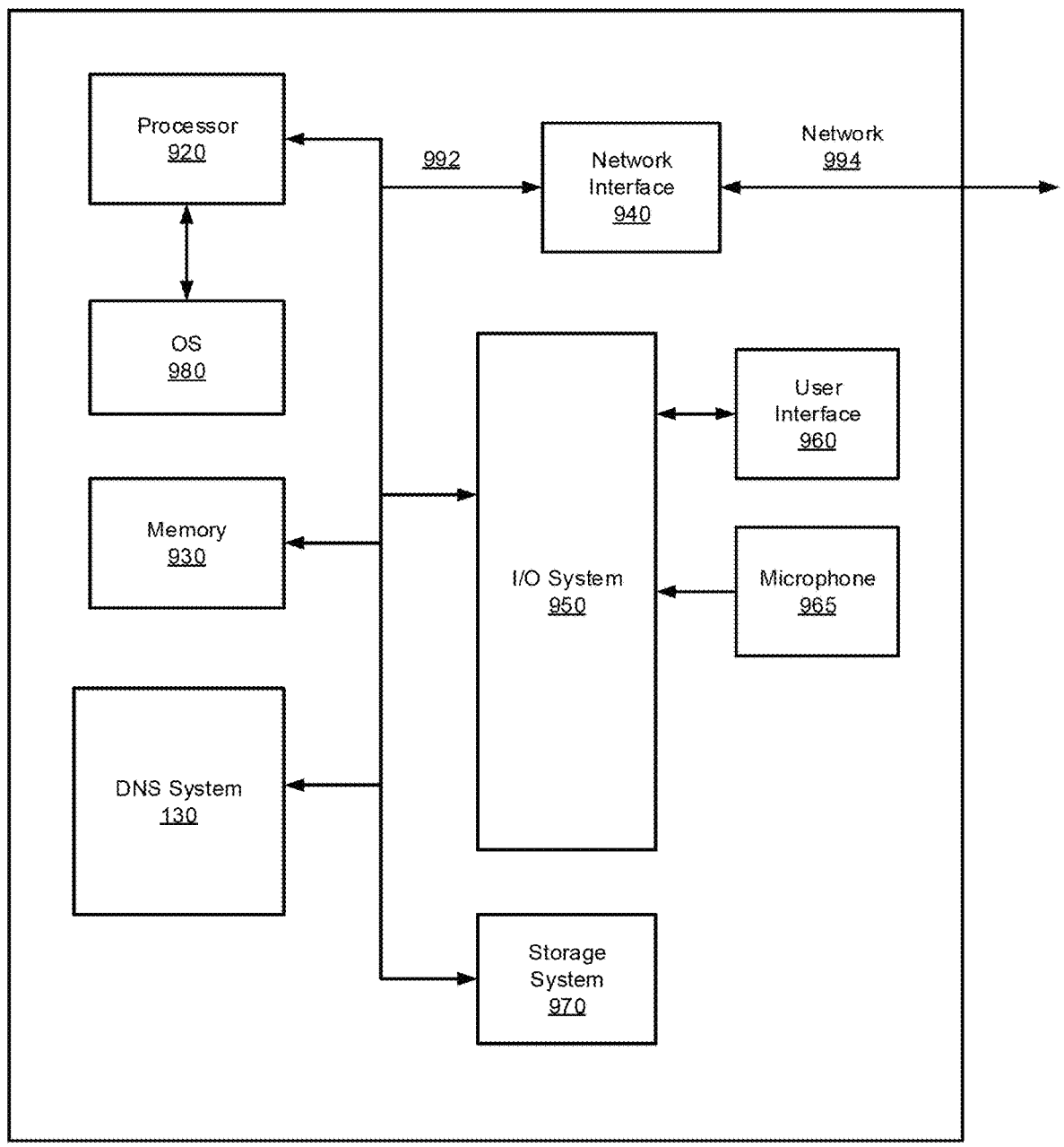
FIG. 9 is a block diagram schematically illustrating a computing platform configured to perform dynamic noise suppression, in accordance with an embodiment of the present disclosure.

FIG. 9 is a block diagram schematically illustrating a computing platform configured to perform dynamic noise suppression, in accordance with an embodiment of the present disclosure. In some embodiments, platform 900 may be a speech-enabled device or a communication system (e.g., a teleconferencing system) that is hosted on, or otherwise incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone, smart-speaker, or smart-tablet), mobile internet device (MID), messaging device, data communication device, wearable device, embedded system, home management system, and so forth. Any combination of different devices may be used in certain embodiments.

In some embodiments, platform 900 may comprise any combination of a processor 920, a memory 930, a DNS system 130, a network interface 940, an input/output (I/O) system 950, a user interface 960, a microphone or microphone array 965, and a storage system 970. As can be further seen, a bus and/or interconnect 992 is also provided to allow for communication between the various components listed above and/or other components not shown. Platform 900 can be coupled to a network 994 through network interface 940 to allow for communications with other computing devices, platforms, devices to be controlled, or other resources. Other componentry and functionality not reflected in the block diagram of FIG. 9 will be apparent in light of this disclosure, and it will be appreciated that other embodiments are not limited to any particular hardware configuration.

Processor 920 can be any suitable processor, and may include one or more coprocessors or controllers, such as an audio processor, a graphics processing unit, or hardware accelerator, to assist in control and processing operations associated with platform 900. In some embodiments, the processor 920 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 920 may be implemented as a complex instruction set computer (CISC) or a reduced instruction set computer (RISC) processor. In some embodiments, processor 920 may be configured as an x86 instruction set compatible processor.

Memory 930 can be implemented using any suitable type of digital storage including, for example, flash memory and/or random-access memory (RAM). In some embodiments, the memory 930 may include various layers of memory hierarchy and/or memory caches as are known to those of skill in the art. Memory 930 may be implemented as a volatile memory device such as, but not limited to, a RAM, dynamic RAM (DRAM), or static RAM (SRAM) device. Storage system 970 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 970 may comprise technology to increase the storage performance enhanced protection for valuable digital media when multiple hard drives are included.

Processor 920 may be configured to execute an Operating System (OS) 980 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 900, and therefore may also be implemented using any suitable existing or subsequently-developed platform.

Network interface circuit 940 can be any appropriate network chip or chipset which allows for wired and/or wireless connection between other components of platform 900 and/or network 994, thereby enabling platform 900 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 950 may be configured to interface between various I/O devices and other components of platform 900. I/O devices may include, but not be limited to, user interface 960 and microphone(s) 965, which may be configured to provide audio for processing by DNS system 130. User interface 960 may include devices (not shown) such as a display element, touchpad, keyboard, and mouse, etc. I/O system 950 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 920 or any chipset of platform 900.

It will be appreciated that in some embodiments, the various components of platform 900 may be combined or integrated in a system-on-a-chip (SoC) architecture. In some embodiments, the components may be hardware components, firmware components, software components or any suitable combination of hardware, firmware or software.

DNS system 130 is configured to provide reduced latency dynamic noise suppression using convolutional neural networks with internal state buffering, as described previously. DNS system 130 may include any or all of the circuits/components illustrated in FIGS. 2-4, as described above. These components can be implemented or otherwise used in conjunction with a variety of suitable software and/or hardware that is coupled to or that otherwise forms a part of platform 900. These components can additionally or alternatively be implemented or otherwise used in conjunction with user I/O devices that are capable of providing information to, and receiving information and commands from, a user.

In some embodiments, these circuits may be installed local to platform 900, as shown in the example embodiment of FIG. 9. Alternatively, platform 900 can be implemented in a client-server arrangement wherein at least some functionality associated with these circuits is provided to platform 900 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 994 or remotely coupled to network 994 by one or more other networks and/or communication channels. In some cases, access to resources on a given network or computing system may require credentials such as usernames, passwords, and/or compliance with any other suitable security mechanism.

In various embodiments, platform 900 may be implemented as a wireless system, a wired system, or a combination of both. When implemented as a wireless system, platform 900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 900 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 994. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 900 may comprise additional, fewer, or alternative subcomponents as compared to those included in the example embodiment of FIG. 9.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a dynamic noise suppression system, the system comprising: an encoder circuit to generate a magnitude spectrum and a phase spectrum of an input audio signal, the input audio signal comprising speech and dynamic noise; a separator circuit comprising a temporal convolution network (TCN) to generate a separation mask based on the magnitude spectrum, wherein the TCN comprises one or more depth-wise (DW) convolution layers, each DW convolution layer including a state buffer to store a number of previous states of the associated DW convolution layer, the number of stored previous states based on a dilation factor of the associated DW convolution layer; a mixer to multiply the separation mask with the magnitude spectrum to separate the speech from the dynamic noise to obtain a denoised magnitude spectrum; and a decoder circuit to reconstruct the input audio signal with reduced dynamic noise, based on the denoised magnitude spectrum and the phase spectrum.

Example 2 includes the subject matter of Example 1, wherein the TCN comprises two stacks of the DW convolution layers, each stack including five of the DW convolution layers.

Example 3 includes the subject matter of Examples 1 or 2, wherein a first of the five DW convolution layers employs a dilation factor of one, a second of the five DW convolution layers employs a dilation factor of two, a third of the five DW convolution layers employs a dilation factor of four, a fourth of the five DW convolution layers employs a dilation factor of eight, and a fifth of the five DW convolution layers employs a dilation factor of sixteen.

Example 4 includes the subject matter of any of Examples 1-3, wherein the number of stored previous states is two times the dilation factor.

Example 5 includes the subject matter of any of Examples 1-4, wherein the TCN is trained on processed training audio data, wherein the processed training audio data is generated by zeroing selected samples of a training audio signal, the training audio signal comprising a speech component and a noise component.

Example 6 includes the subject matter of any of Examples 1-5, wherein a first subset of the selected samples is associated with segments of the training audio signal that do not include the speech component, and a second subset of the selected samples is chosen by a randomized selection process.

Example 7 includes the subject matter of any of Examples 1-6, wherein the segments of the training audio signal that do not include the speech component are determined by a voice activity detector.

Example 8 is a teleconferencing or online collaboration system comprising the system of any of Examples 1-7.

Example 9 is a processor-implemented method for dynamic noise suppression, the method comprising: generating, by a processor-based system, a magnitude spectrum and a phase spectrum of an input audio signal, the input audio signal comprising speech and dynamic noise; employing, by the processor-based system, a temporal convolution network (TCN) to generate a separation mask based on the magnitude spectrum, wherein the TCN comprises one or more depth-wise (DW) convolution layers, each DW convolution layer including a state buffer to store a number of previous states of the associated DW convolution layer, the number of stored previous states based on a dilation factor of the associated DW convolution layer; multiplying, by the processor-based system, the separation mask with the magnitude spectrum to separate the speech from the dynamic noise to obtain a denoised magnitude spectrum; and reconstructing, by the processor-based system, the input audio signal with reduced dynamic noise based on the denoised magnitude spectrum and the phase spectrum.

Example 10 includes the subject matter of Example 9, wherein the TCN comprises two stacks of the DW convolution layers, each stack including five of the DW convolution layers.

Example 11 includes the subject matter of Examples 9 or 10, wherein a first of the five DW convolution layers employs a dilation factor of one, a second of the five DW convolution layers employs a dilation factor of two, a third of the five DW convolution layers employs a dilation factor of four, a fourth of the five DW convolution layers employs a dilation factor of eight, and a fifth of the five DW convolution layers employs a dilation factor of sixteen.

Example 12 includes the subject matter of any of Examples 9-11, further comprising generating processed training audio data, for training of the TCN, by zeroing selected samples of a training audio signal, the training audio signal comprising a speech component and a noise component.

Example 13 includes the subject matter of any of Examples 9-12, wherein a first subset of the selected samples is associated with segments of the training audio signal that do not include the speech component, and a second subset of the selected samples is chosen by a randomized selection process.

Example 14 is at least one non-transitory machine-readable storage medium having instructions encoded thereon that, when executed by one or more processors, cause a process to be carried out for dynamic noise suppression, the process comprising: generating a magnitude spectrum and a phase spectrum of an input audio signal, the input audio signal comprising speech and dynamic noise; employing a temporal convolution network (TCN) to generate a separation mask based on the magnitude spectrum, wherein the TCN comprises one or more depth-wise (DW) convolution layers, each DW convolution layer including a state buffer to store a number of previous states of the associated DW convolution layer, the number of stored previous states based on a dilation factor of the associated DW convolution layer; multiplying the separation mask with the magnitude spectrum to separate the speech from the dynamic noise to obtain a denoised magnitude spectrum; and reconstructing the input audio signal with reduced dynamic noise based on the denoised magnitude spectrum and the phase spectrum.

Example 15 includes the subject matter of Example 14, wherein the TCN comprises two stacks of the DW convolution layers, each stack including five of the DW convolution layers.

Example 16 includes the subject matter of Examples 14 or 15, wherein a first of the five DW convolution layers employs a dilation factor of one, a second of the five DW convolution layers employs a dilation factor of two, a third of the five DW convolution layers employs a dilation factor of four, a fourth of the five DW convolution layers employs a dilation factor of eight, and a fifth of the five DW convolution layers employs a dilation factor of sixteen.

Example 17 includes the subject matter of any of Examples 14-16, wherein the number of stored previous states is two times the dilation factor.

Example 18 includes the subject matter of any of Examples 14-17, wherein the process comprises generating processed training audio data, for training of the TCN, by zeroing selected samples of a training audio signal, the training audio signal comprising a speech component and a noise component.

Example 19 includes the subject matter of any of Examples 14-18, wherein a first subset of the selected samples is associated with segments of the training audio signal that do not include the speech component, and a second subset of the selected samples is chosen by a randomized selection process.

Example 20 is a teleconferencing or online collaboration system comprising the at least one computer readable storage medium of any of claims 14-19.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A dynamic noise suppression system, the system comprising:
   an encoder circuit to generate a magnitude spectrum and a phase spectrum of an input audio signal, the input audio signal comprising speech and dynamic noise;
   a separator circuit comprising a temporal convolution network (TCN) to generate a separation mask based on the magnitude spectrum, wherein the TCN comprises one or more depth-wise (DW) convolution layers, each DW convolution layer including a state buffer to store a number of previous states of the associated DW convolution layer, the number of stored previous states based on a dilation factor of the associated DW convolution layer, wherein each DW convolution layer is configured to use one or more of the previous states stored in the state buffer of the associated DW convolutional layer to generate an output;
   a mixer to multiply the separation mask with the magnitude spectrum to separate the speech from the dynamic noise to obtain a denoised magnitude spectrum; and
   a decoder circuit to reconstruct the input audio signal with reduced dynamic noise, based on the denoised magnitude spectrum and the phase spectrum.

2. The system of claim 1, wherein the TCN comprises two stacks of the DW convolution layers, each stack including five of the DW convolution layers.

3. The system of claim 2, wherein a first of the five DW convolution layers employs a dilation factor of one, a second of the five DW convolution layers employs a dilation factor of two, a third of the five DW convolution layers employs a dilation factor of four, a fourth of the five DW convolution layers employs a dilation factor of eight, and a fifth of the five DW convolution layers employs a dilation factor of sixteen.

4. The system of claim 1, wherein the number of stored previous states is two times the dilation factor.

5. The system of claim 1, wherein the TCN is trained on processed training audio data, wherein the processed training audio data is generated by zeroing selected samples of a training audio signal, the training audio signal comprising a speech component and a noise component.

6. The system of claim 5, wherein a first subset of the selected samples is associated with segments of the training audio signal that do not include the speech component, and a second subset of the selected samples is chosen by a randomized selection process.

7. The system of claim 6, wherein the segments of the training audio signal that do not include the speech component are determined by a voice activity detector.

8. A teleconferencing or online collaboration system comprising the system of claim 1.

9. A processor-implemented method for dynamic noise suppression, the method comprising:
generating, by a processor-based system, a magnitude spectrum and a phase spectrum of an input audio signal, the input audio signal comprising speech and dynamic noise;
employing, by the processor-based system, a temporal convolution network (TCN) to generate a separation mask based on the magnitude spectrum, wherein the TCN comprises one or more depth-wise (DW) convolution layers, each DW convolution layer including a state buffer to store a number of previous states of the associated DW convolution layer, the number of stored previous states based on a dilation factor of the associated DW convolution layer, wherein each DW convolution layer is configured to use one or more of the previous states stored in the state buffer of the associated DW convolutional layer to generate an output;
multiplying, by the processor-based system, the separation mask with the magnitude spectrum to separate the speech from the dynamic noise to obtain a denoised magnitude spectrum; and
reconstructing, by the processor-based system, the input audio signal with reduced dynamic noise based on the denoised magnitude spectrum and the phase spectrum.

10. The method of claim 9, wherein the TCN comprises two stacks of the DW convolution layers, each stack including five of the DW convolution layers.

11. The method of claim 10, wherein a first of the five DW convolution layers employs a dilation factor of one, a second of the five DW convolution layers employs a dilation factor of two, a third of the five DW convolution layers employs a dilation factor of four, a fourth of the five DW convolution layers employs a dilation factor of eight, and a fifth of the five DW convolution layers employs a dilation factor of sixteen.

12. The method of claim 9, further comprising generating processed training audio data, for training of the TCN, by zeroing selected samples of a training audio signal, the training audio signal comprising a speech component and a noise component.

13. The method of claim 12, wherein a first subset of the selected samples is associated with segments of the training audio signal that do not include the speech component, and a second subset of the selected samples is chosen by a randomized selection process.

14. At least one non-transitory machine-readable storage medium having instructions encoded thereon that, when executed by one or more processors, cause a process to be carried out for dynamic noise suppression, the process comprising:
generating a magnitude spectrum and a phase spectrum of an input audio signal, the input audio signal comprising speech and dynamic noise;
employing a temporal convolution network (TCN) to generate a separation mask based on the magnitude spectrum, wherein the TCN comprises one or more depth-wise (DW) convolution layers, each DW convolution layer including a state buffer to store a number of previous states of the associated DW convolution layer, the number of stored previous states based on a dilation factor of the associated DW convolution layer, wherein each DW convolution layer is configured to use one or more of the previous states stored in the state buffer of the associated DW convolutional layer to generate an output;
multiplying the separation mask with the magnitude spectrum to separate the speech from the dynamic noise to obtain a denoised magnitude spectrum; and
reconstructing the input audio signal with reduced dynamic noise based on the denoised magnitude spectrum and the phase spectrum.

15. The at least one non-transitory machine-readable storage medium of claim 14, wherein the TCN comprises two stacks of the DW convolution layers, each stack including five of the DW convolution layers.

16. The at least one non-transitory machine-readable storage medium of claim 15, wherein a first of the five DW convolution layers employs a dilation factor of one, a second of the five DW convolution layers employs a dilation factor of two, a third of the five DW convolution layers employs a dilation factor of four, a fourth of the five DW convolution layers employs a dilation factor of eight, and a fifth of the five DW convolution layers employs a dilation factor of sixteen.

17. The at least one non-transitory machine-readable storage medium of claim 14, wherein the number of stored previous states is two times the dilation factor.

18. The at least one non-transitory machine-readable storage medium of claim 14, wherein the process comprises generating processed training audio data, for training of the TCN, by zeroing selected samples of a training audio signal, the training audio signal comprising a speech component and a noise component.

19. The at least one non-transitory machine-readable storage medium of claim 18, wherein a first subset of the selected samples is associated with segments of the training audio signal that do not include the speech component, and a second subset of the selected samples is chosen by a randomized selection process.

20. A teleconferencing or online collaboration system comprising the at least one non-transitory machine-readable storage medium of claim 14.

* * * * *